United States Patent

[11] 3,579,178

| | | |
|---|---|---|
| [72] | Inventor | Allen Edwin Travis<br>Harrisburg, Pa. |
| [21] | Appl. No. | 882,069 |
| [22] | Filed | Dec. 4, 1969 |
| [45] | Patented | May 18, 1971 |
| [73] | Assignee | AMP Incorporated<br>Harrisburg, Pa. |

[54] ELECTRICAL TERMINAL AND HOUSING THEREFORE
3 Claims, 5 Drawing Figs.

[52] U.S. Cl. .................................................. 339/221,
339/214
[51] Int. Cl. .................................................. H01r 9/08
[50] Field of Search .................................................. 339/217,
220, 221, 214, 215, 276, 213, 223, 5 (R)

[56] References Cited
UNITED STATES PATENTS

| | | | |
|---|---|---|---|
| 2,585,070 | 2/1952 | Allard .......................... | 339/5(R)X |
| 2,928,066 | 3/1960 | Gordon ........................ | 339/198 |
| 3,465,279 | 9/1969 | Krehbiel ...................... | 339/30 |

FOREIGN PATENTS

| | | | |
|---|---|---|---|
| 1,060,271 | 3/1967 | Great Britain ................ | 339/221 |

Primary Examiner—Marvin A. Champion
Assistant Examiner—Robert A. Hafer
Attorneys—Curtis, Morris and Safford, William J. Keating, Ronald D. Grefe, William Hintze, Adrian J. La Rue, Frederick W. Raring, Jay L. Seitchik and John P. Vandenburg ABSTRACT: The disclosure relates to terminals for terminating the lead ends of a coil winding and includes provisions for securing the terminals within apertures located in flanges integral with a coil bobbin with a portion of the terminals extending from the flange for plugging into mating receptacles.

PATENTED MAY 18 1971 3,579,178
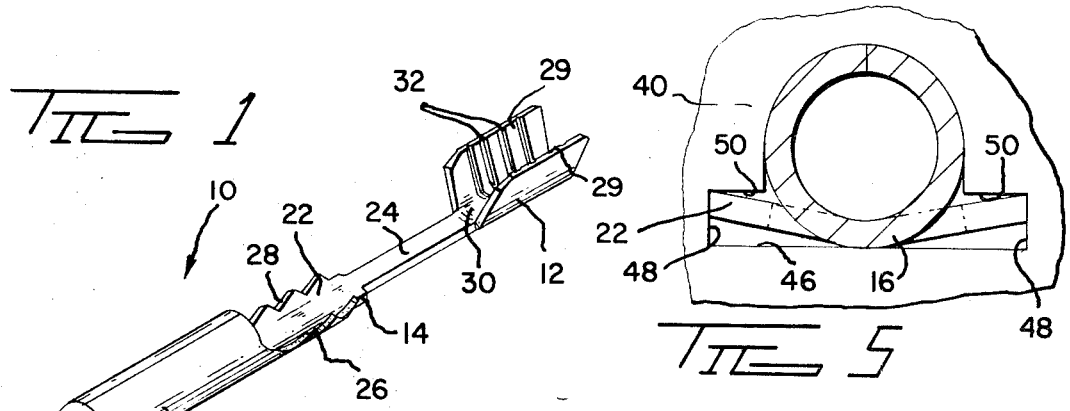
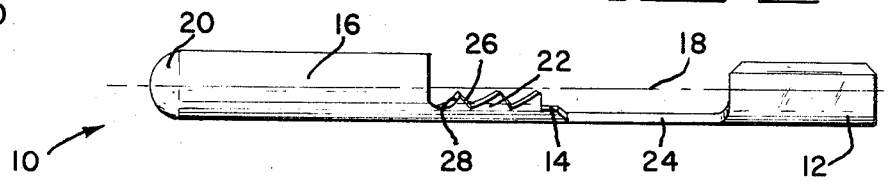
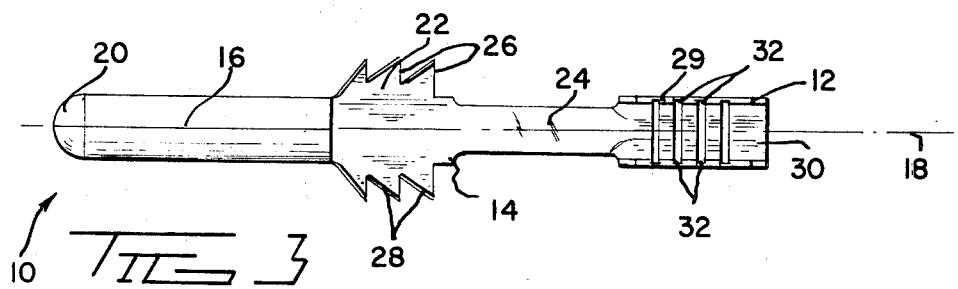
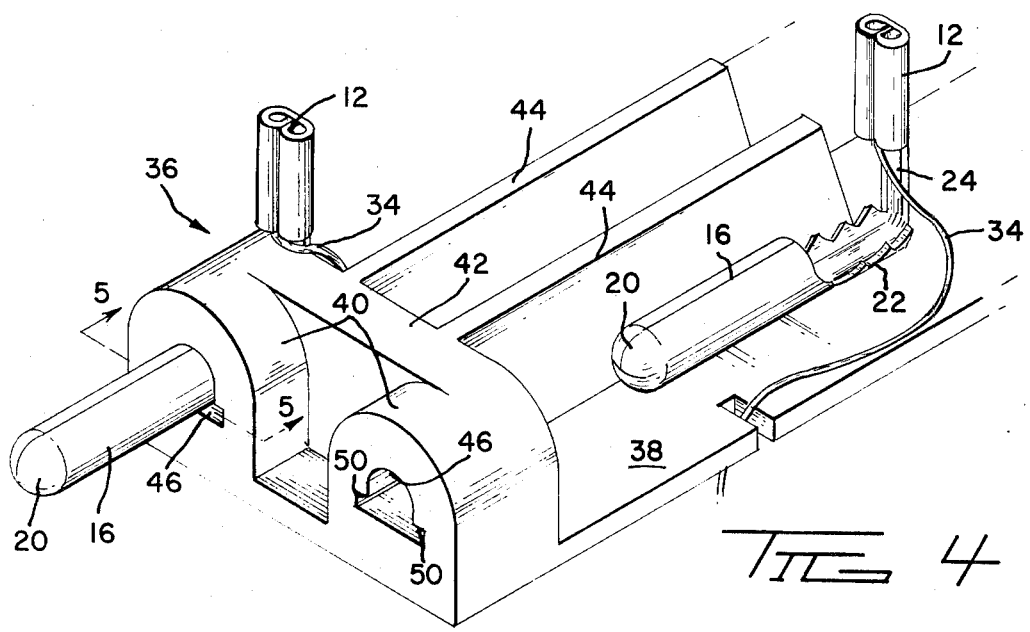

ELECTRICAL TERMINAL AND HOUSING THEREFORE

BACKGROUND OF THE INVENTION

It is the practice in the coil winding art to connect the lead ends of the winding or windings to a tab affixed to the coil bobbin by a soldering operation. In turn, the coil winding is connected to extraneous circuitry by soldering such circuitry to the tabs affixed to the bobbin. In practice, these soldering operations are time consuming, and when replacement of windings is desired, unsoldering and resoldering operations are required.

In some applications, one soldering operation is eliminated by mechanically winding the winding lead a turn or more around a tab on the bobbin and then forcing a terminal down over the tab or in a tight fit against the tab by inserting it into a cavity between the tab and a portion of the bobbin. As can be seen, this type connection is costly insofar as number of parts is concerned, and still requires an insulation stripping step to prepare the lead for electrical contact. If coil replacement is desired, such may be readily achieved by with the attendant risk of fracturing the solder connection as between the terminal and the extraneous circuitry during either removal or replacement of the coil.

SUMMARY OF THE INVENTION

It is an object of the disclosed invention to provide a coil winding connection whereby solder connections are eliminated.

It is a further object of the disclosed invention to provide a terminal connection that eliminates the need for stripping the insulation from a coil winding lead.

It is still another object of the disclosed invention to provide a terminal connection system that will allow a coil winding to be easily replaced by unplugging the defective winding and plugging in a new winding.

These objects and still others are accomplished by the use of a terminal or connector having a ferrule at one end with serrations therein for receiving a winding lead. Upon crimping of the ferrule, the serrations penetrate the insulation on the wire lead thereby insuring a good electrical connection. At the other end of the terminal is a male contact portion designed to be plugged into a receptacle in extraneous circuitry. That portion of the terminal intermediate the contact and ferrule portions is designed to frictionally engage the sidewalls of an aperture located in a flange portion of the coil bobbin, leaving the connector and ferrule portions projecting from either end. This intermediate portion has serrated edges to insure a strong mechanical fit as between the terminal and the apertures in the bobbin flange.

Thus it is seen that all soldering is eliminated and the preparation of a coil winding is accomplished merely by inserting the terminals into the bobbin flange apertures, placing the winding leads within the respective ferrules, and crimping the ferrules. The coil may then be plugged into any circuit designed to accept it.

BRIEF DESCRIPTION OF THE DRAWINGS

FIG. 1 is a perspective view of the terminal as embodied in the present invention;

FIG. 2 is a side view of the terminal shown in FIG. 1;

FIG. 3 is a top view of the terminal shown in FIG. 1;

FIG. 4 is a perspective view showing one terminal prior to assembly with the bobbin flange and one terminal after assembly and after crimping of the ferrule about the winding lead; and FIG. 5 is a section view taken along line 5-5 of FIG. 4.

DESCRIPTION OF THE PREFERRED EMBODIMENT

The attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive or limiting of the invention but are given for purposes of illustration in order that others skilled in the art may fully understand the invention and the principles thereof and the manner of applying it in practical use so that they may modify it in various forms, each as may be best suited to the conditions of a particular use.

In FIG. 1 there is shown the terminal or connector 10 as embodied in the present invention. The terminal is comprised of a one-piece metal blank that is progressively shaped into ferrule 12, a transition portion 14, and a contact 16. The contact 16 is of elongated cylindrical configuration formed up out of the plane of the blank about a central longitudinal axis 18. The contact 16 has a rounded or generally spherically shaped nose portion 20 which facilitates ease of entry into a mating receptacle (not shown). It is envisioned, of course, that the nose portion may be pointed, flat, or omitted as dictated by the particular use intended.

The transition portion 14 extends from the contact 16 generally parallel with axis 18. This transition portion throughout approximately half of its length has serrations or teeth 22 formed in the edges thereof. This serrated section is considerably larger in width than the remainder 24 of the transition portion. This remaining portion 24 is substantially flat and lies in a plane tangent to the cylindrical contact 16. The teeth 22 curve upwardly out from of the transition portion in a direction toward a plane in which the axis 18 lies and which is parallel to the plane of the transition portion 24. As seen in FIG. 3, the teeth 22 extend outwardly beyond the radius of cylindrical contact 16. These teeth 22 each comprise two edges meeting to form a point. A first edge 26 is normal to the longitudinal dimension of the terminal 10. The second edge 28 is inclined relative to the longitudinal dimension of the terminal and extends outwardly and away from the contact 16.

The ferrule is an open ferrule comprising two slightly diverging sidewalls 29, and a bottom wall 30 connecting the two sidewalls 29. The bottom wall is of generally cylindrical configuration about central axis 18, while the two sidewalls extend tangentially therefrom. The three wall portions contain continuous serrations therein, as indicated at 32, for example. The purpose of these serrations, in addition to ensuring a tight mechanical connection as between the ferrule and winding lead, is to penetrate the insulation on the winding lead and make electrical contact with the winding lead. The ferrule, after being crimped about the winding lead 34, is as depicted in FIG. 4.

In FIG. 4 there is shown the flanged portion 36 of a coil bobbin 38. The remainder of the bobbin is not shown, as it may be one of many varied configurations to suit a specific application. In the preferred embodiment, the flanged portion 36 includes two flanges 40, upstanding from and integral with the coil bobbin 38. The two flanges are joined by a web portion 42 which gives added strength and support to the flanges and, in addition, provides a means for further bracing the flanges by the addition of reinforcing ribs 44 integral with and normal to the web 42 and the bobbin 38.

Each flange 40 has located therethrough an aperture 46 for receiving a terminal 10. The aperture 46 is constant in cross section and, as seen in FIG. 5, has a cross-sectional outline of a rectangle superimposed upon a circle with the superimposed portion being defined by an arc and its chord, the chord being common with a portion of a longer side of the rectangle. The terminals 10 are inserted into the aperture 46 as shown in FIGS. 4 and 5, with the teeth 22 in tight frictional contact with the sidewalls 48 and top wall portions 50 of the rectangular portion of the aperture.

As can be seen in FIG. 4 most of the contact extends from the aperture 46 with a small portion of it remaining within to promote stability in the interfitting of the two pieces. In the preferred embodiment, an insertion force of approximately thirty pounds is required. Thus it can be seen that a much stronger force would be required to force the terminal back out against the friction of teeth 22. In practice, the ferrule end is bent up ninety degrees but may be left unbent if so desired. The winding lead may be crimped within the ferrule either before or after insertion of the terminal within the aperture 46.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. An electrical terminal adapted for mechanical insertion into a coil bobbin comprising a ferrule adapted to receive the lead end portion of a wire, an elongated contact, said contact being cylindrical in shape about a longitudinal axis, and an elongated transition portion, said transition portion integrally connecting said ferrule with said contact, said transition portion having a plurality of teeth therein extending outwardly from opposite edges of a section thereof, part of said transition portion and a portion of said ferrule lying in a first plane parallel to said axis and tangent to said contact and said cylindrical ferrule portion, and wherein said teeth extend away from said transition portion at an angle toward a second plane parallel to said first plane, said longitudinal axis of said contact lying in said second plane.

2. An electrical terminal as set forth in claim 1 wherein each of said teeth are pointed and comprise two sides, a first side of said teeth extends substantially perpendicular from said side edges of said transition portion, and a second side of said teeth is inclined and extends from said side edges outwardly away from said contact.

3. An electrical terminal and a housing therefore, said terminal comprising a ferrule adapted to receive the lead end portion of a wire, an elongated contact, and an elongated transition portion, said transition portion integrally connecting said ferrule with said contact portion, said transition portion having a plurality of teeth extending from opposite side edges of a portion thereof, said housing comprising a coil bobbin, at least one flange located thereon and having an elongated aperture therethrough shorter in length than said terminal, said terminal being located in said aperture with said teeth in frictional contact with wall portions thereof wherein said elongated aperture, in cross section through any portion thereof, has a configuration of a circle in superimposed relationship with a rectangle, and wherein said wall portions frictionally contacting said teeth correspond to portions of said rectangle.